J. W. STUBBS.
ELECTRODE.
APPLICATION FILED OCT. 23, 1909.

947,358.

Patented Jan. 25, 1910.

Witnesses:
M. Johnson
W. H. Stevens

Inventor
John William Stubbs

UNITED STATES PATENT OFFICE.

JOHN WILLIAM STUBBS, OF MIDDLEWICH, ENGLAND, ASSIGNOR TO THE GENERAL ELECTROLYTIC PARENT COMPANY LIMITED, OF MIDDLEWICH, ENGLAND.

ELECTRODE.

947,358.  Specification of Letters Patent.  Patented Jan. 25, 1910.

Application filed October 23, 1909. Serial No. 524,242.

*To all whom it may concern:*

Be it known that I, JOHN WILLIAM STUBBS, a subject of the King of Great Britain, residing at Middlewich, in the county of Chester, England, have invented a new and useful Improvement in Electrodes, of which the following is a specification.

The invention relates to improvements upon the invention covered by Letters Patent No. 731453 of 1903, and has for its object to construct electrodes of that kind in a simpler and more expeditious manner. It is hereafter described in conjunction with the accompanying drawings wherein—

Figures 1, 2:
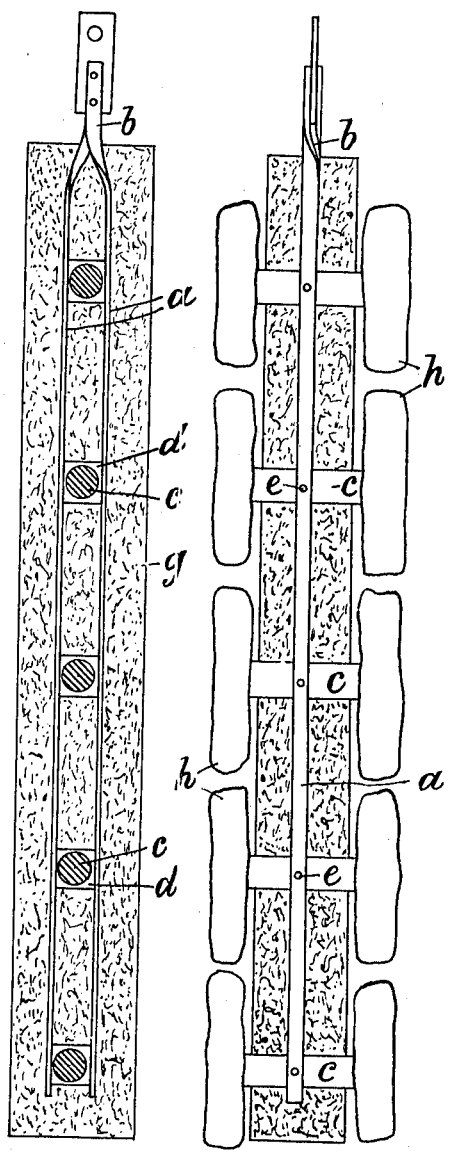
Figure 3:
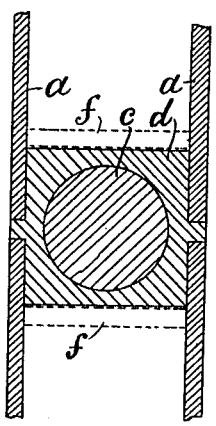

Figures 1 and 2 are sectional views at right angles to each other of an electrode and Fig. 3 is a detail view to an enlarged scale.

In carrying out the invention we provide a pair of conductor bars $a$ of metal which may be connected together at one end $b$ for convenience of attachment to the external electric conductors and are separate for the remainder of their length. Between the bars $a$ are disposed at intervals the cross bars or nipples of carbon $c$. Lead or other suitable easily fusible metal $d$ is then cast around the carbon nipples and between them and the carbon bars $a$ thus attaching the carbon nipples firmly to the conductor bars both mechanically and electrically. Holes $e$ may be made in the conductor bars into which the lead will flow for stronger attachment of the lead.

When casting the lead we prefer to place distance pieces between the conductor bars on each side of each carbon nipple as shown by dotted lines $f$ so as to form molds into which the lead is poured, the bars being laid on a table. The distance pieces may be either removed or not when the metal has cooled, and the conductor bars are then coated with tar, pitch, paraffin wax, asbestos impregnated with oil, or other impervious insulating material to prevent diffusion of the electrolyte to the metal, and corrosion of the latter, and finally covered with Portland cement or other similar insulating cement or material $g$. The ends of the carbon nipples are furnished with the usual carbon blocks $h$.

I claim—

1. An electrode having two separated straight metal conductor bars, cross bars of carbon placed at intervals between the conductor bars, and cast metallic connections between the conductor bars and the carbon bars, substantially as set forth.

2. An electrode having two separated straight metal conductor bars, cross bars of carbon placed at intervals between the conductor bars, distance pieces between the conductor bars on each side of each carbon bar, and cast metallic connections between the conductor bars and the carbon bars, substantially as set forth.

In testimony whereof I have signed my name to this specification in the presence of two subscribing witnesses.

JOHN WILLIAM STUBBS.

Witnesses:
  W. B. JOHNSON,
  W. H. STEVENS.